No. 852,599. PATENTED MAY 7, 1907.
M. E. DRIPPS.
EYEGLASS HOLDER.
APPLICATION FILED DEC. 27, 1906.
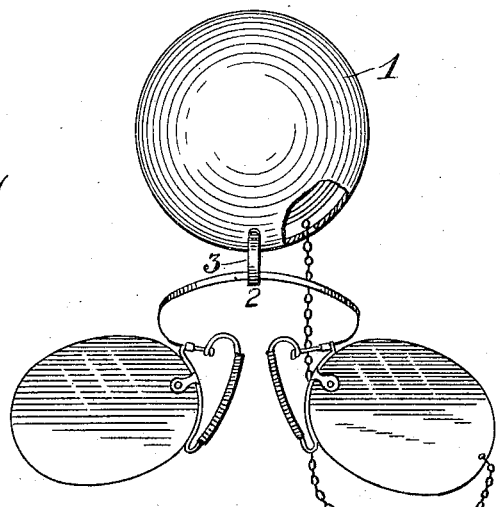
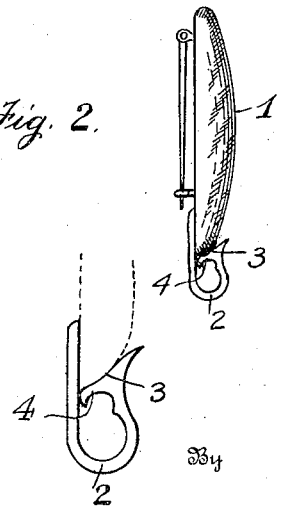
Witnesses
F. L. Ourand
H. T. McKeever
Inventor
Mary E. Dripps,
By J. Mc...Master,
Attorney

UNITED STATES PATENT OFFICE.

MARY E. DRIPPS, OF WASHINGTON, DISTRICT OF COLUMBIA.

EYEGLASS-HOLDER.

No. 852,599.         Specification of Letters Patent.         Patented May 7, 1907.

Application filed December 27, 1906. Serial No. 349,679.

*To all whom it may concern:*

Be it known that I, MARY E. DRIPPS, a citizen of the United States, residing at Washington, in the District of Columbia, have invented certain new and useful Improvements in Eyeglass-Holders, of which the following is a specification.

My invention relates to improvements in the class of eye glass holders wherein the eye glasses are suspended from suitable means, as a chain, adapted to be coiled by spring action within a casing or inclosure and more especially to hooks therefor. Its objects are to provide for conveniently supporting the eye glasses in position out of the way, more particularly for their retention in place against dangling as experienced with the above referred to form of eye glass suspending means; and to provide for effecting that purpose in a simple, economic and effective manner.

Said invention consists in the detailed structural features thereof substantially as hereinafter fully described and specifically pointed out by the claims.

In the accompanying drawing illustrating the preferred embodiment of my invention: Figure 1 is a front or face view thereof, showing its practical application. Fig. 2 is a side or edge elevation of the same. Fig. 3 is an enlarged detached side view of the invention.

In carrying out my invention, I employ, in connection with a casing or inclosure 1, such as used in the type of eye glass suspending contrivances above noted, a spring metal hook 2 having one end brazed or soldered to the back of said casing near its bottom edge. Said hook has its lower central portion formed into a loop and its forward part just at the upper forward terminal of the latter abutting or pressing against the front bottom edge of said casing, as at 3, for closing the entrance to said loop, said hook then being deflected outward and upward a short distance away from the front or face surface of said casing to permit of the ready engagement therewith of the requisite or central portion of the eye glass, as in snapping the latter, by the casing-engaging or pressing part 3 of the hook for the insertion of the eye glasses into and supporting the same in said hook loop conveniently out of the way when not required for use, thus obviating their dangling from said casing, as would otherwise be the case. Also said hook is provided below the point of its engagement (3) with the casing 1, with an inward-extending tapered projection 4 having its free end contacting with the opposite portion of the hook and adapted to extend transversely to a line passing between said hook and said casing and close to the latter, and facing or presented downward for guarding said point, and whereby any tendency of the upward displacement of the eye glasses especially as would be likely to be the case by the accidental forcing of its lens-connecting member edgewise upward is intercepted or guarded against, as is plain. It is needless to remark that, by allowing the eye glasses to occupy a dangling position, not only is such unpresentable and ungainly and otherwise objectionable from esthetic view-point, but the eye glasses are liable, when the owner should stoop or lean over, to be caught in any near-by object and their suspending chain thus also liable to become broken, as is apparent. With the glasses upheld out of the way, as in the use of my invention, both the latter and the withdrawn portion of the chain are neatly arranged or disposed, and the chain prevented from becoming involved with the glasses, as is obvious. It is apparent that the invention is greatly desirable for its intended purpose, especially in connection with this type of eye glass holders; while it is exceedingly simple, effective and may be manufactured at the minimum expense.

I claim:

An eye glass holder of the character described, comprising a casing for inclosing the eye glass suspending means, and a spring hook effective for upholding the eye glasses out of a dangling position, having an upward and outward deflected portion and an inward-extending projection conformed to and engaging the lower front portion of said casing, and its free end contacting with the opposite portion of said hook, for the purpose set forth.

In testimony whereof I have signed my name to this specification in the presence of two subscribing witnesses.

MARY E. DRIPPS.

Witnesses:
    JOHN H. DRIPPS,
    J. WM. MISTER.